RADIO FREQUENCY POWER SPLITTER

Filed Feb. 1, 1960 2 Sheets-Sheet 1

INVENTOR.
ARTHUR A. OLINER
BY Darby & Darby
ATTORNEYS

May 7, 1963 A. A. OLINER 3,089,103

RADIO FREQUENCY POWER SPLITTER

Filed Feb. 1, 1960 2 Sheets-Sheet 2

INVENTOR.
ARTHUR A. OLINER
BY Darby & Darby
ATTORNEYS 3,089,103
Patented May 7, 1963

3,089,103

RADIO FREQUENCY POWER SPLITTER

Arthur A. Oliner, Brooklyn, N.Y., assignor to Merrimac Research and Development, Inc., Flushing, N.Y., a corporation of New York Filed Feb. 1, 1960, Ser. No. 5,973
3 Claims. (Cl. 333—9)

The present invention relates to power splitters for radio frequency energy wherein power is to be divided between two outputs of the power splitting apparatus with minimum interaction between said outputs; more particularly the invention relates to such power splitters which may readily be adapted to provide an unequal splitting of power between two or more output terminals.

A power splitter is a device which divides radio frequency power, usually in the microwave frequency range from a single line into two or more other lines in a predetermined ratio. Any usual configuration to achieve this result has properties such that the output lines are not isolated from each other. Hence, if the termination of one of these output lines is not matched and thus produces a reflected wave, the power in this reflected wave will exist partly into the feeding line and partly into the ouput lines. The former effect is not too detrimental, as it results only in the production of a voltage standing wave ratio in the input line; it is highly undesirable, however, that the latter effect occur, namely that some of the power emerges from an output line, as this in effect alters the power split and degrades the accuracy of the apparatus.

One well known use for power splitting devices is in feed systems for antenna arrays known as the "corporate structure" type. Such a feed system can be described briefly as a series of sets of power splitter devices with each set having a greater number of (usually twice as many) power splitters than the preceding set so that the input of a power splitter in a succeeding set can be connected to each output of a power splitter in the preceding set. With this arrangement any desired number of successive divisions of power can be employed to provide substantially any desired number of equal power outputs. When such a feed system is connected to feed a multiple element antenna array and the elements are imperfectly matched, then it will be seen that the power reflected from these elements interacts with the corporate structure and, because of lack of isolation between the output lines of the power splitters, the phase and amplitude distribution provided to the antenna array elements is disturbed.

It has been previously proposed to utilize directional coupler elements, such as a "magic tee," as a power splitting device. The normal 4-arm magic tee is modified to provide a 3-arm device by placing a matched load on one of the arms. Such an arrangement is an improvement over a simple 3-arm power splitting device with no provision for isolation of the outputs.

However, even the "magic tee" type of power splitter is seriously limited in that it is useful only where an equal power split between outputs is desired. If the desired power split is an unequal one, a device does not exist which permits isolation between the output arms and for which the outputs are in phase over a frequency band. Obviously an equal power split condition is too restrictive for many applications. The present invention provides means for producing a wide range of power splits not limited to equal power splits, at the same time maintaining substantial isolation between the output arms. Embodiments are illustrated for use with coaxial lines and also for use with rectangular waveguides.

In addition to the foregoing features and advantages it is an object of the present invention to provide apparatus for splitting radio frequency power to at least two outputs wherein a high degree of isolation may be obtained between the two outputs.

It is another object of the present invention to provide such a power splitting apparatus which is adaptable to provide unequal splitting of power in a predetermined ratio, still maintaining isolation between outputs.

It is a further object of the present invention to provide such power splitting apparatus which is particularly adapted to use with coaxial line inputs and outputs.

It is a still further object of the present invention to provide such power splitting apparatus which is adaptable for use with rectangular waveguide inputs and outputs.

Further objects and advantages of the present invention will be apparent from the consideration of the following description in conjunction with the appended drawings in which, FIGURE 1 is a vertical longitudinal cross sectional view of a coaxially terminated, unequal power splitting device according to the present invention;

Figure 1:
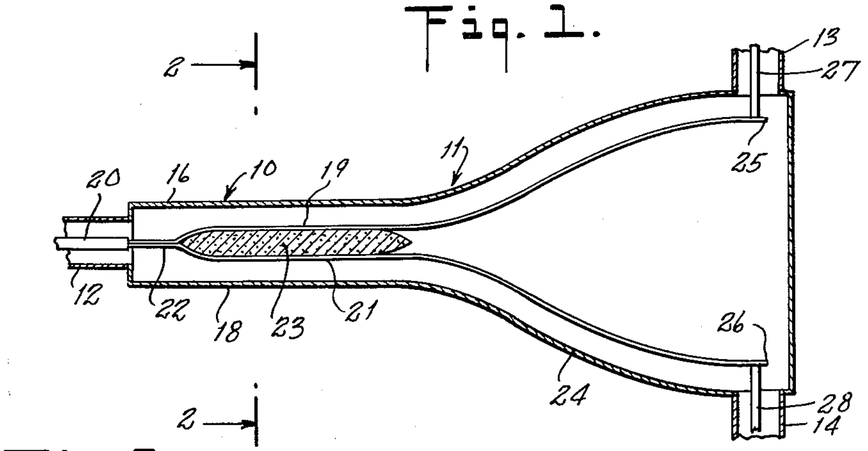
Figure 2:
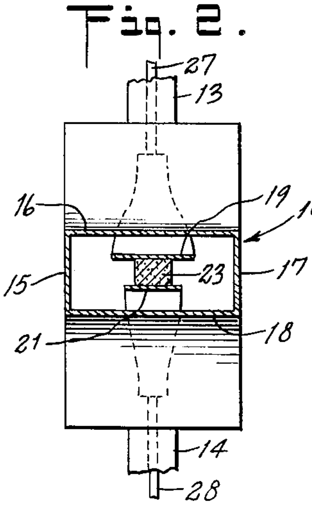
FIGURE 2 is a transverse vertical cross sectional view of the device of FIGURE 1 taken along the line 2—2 in FIGURE 1.
Figures 5, 6, 7, 8, 9, 10:
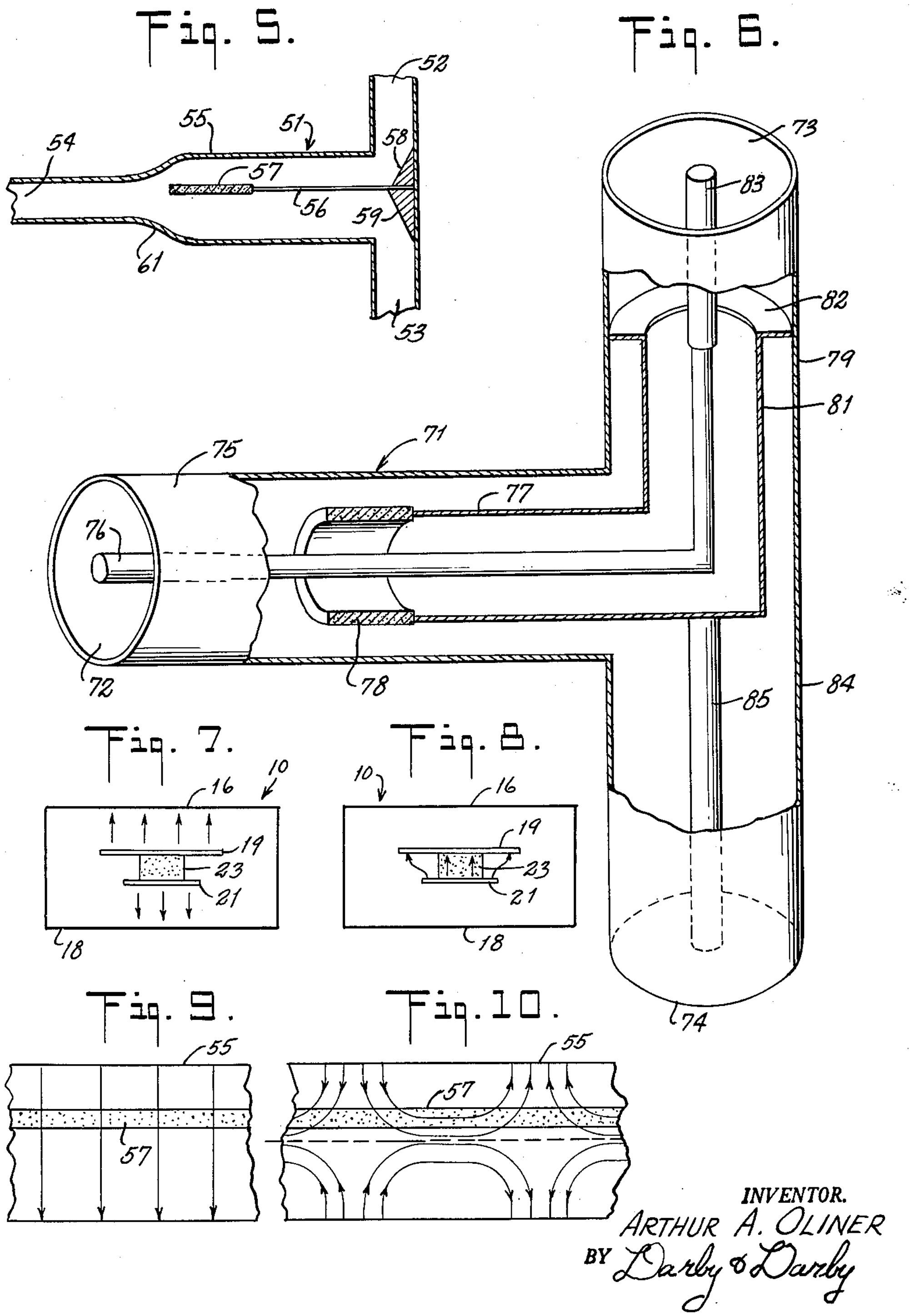
FIGURE 5 is a vertical, longitudinal sectional view of an alternative form of the invention also adapted for use with rectangular waveguide inputs and outputs.
FIGURE 6 is a still further alternative form of the invention shown in an isometric partially broken away view and which is particularly adapted for use with coaxial transmission line inputs and outputs.

FIGURES 7 and 8 are electric field diagrams presented to aid in the explanation of the device of FIGURES 1 and 2; and FIGURES 9 and 10 are electric field diagrams presented to aid in the explanation of the device of FIGURE 5.

Referring now to FIGURE 1, a power splitter device 11 is shown having a coaxial input 12 and coaxial outputs 13 and 14.

The coaxial input 12 leads into an enclosure 10 of conductive material which is of generally rectangular cross section as seen in FIGURE 2, comprising side walls 15 and 17 and top and bottom walls 16 and 18. The center conductors 20 of the coaxial line input 12 is conductively joined to a strip transmission line section 22 arranged centrally within the conductive enclosure 10. A suitable transition between the center conductor 20 and the strip transmission line 22 may be provided in accordance with known techniques. The strip transmission line 22 is divided into two strip transmission line sections 19 and 21 as it progresses to the right in FIGURE 1.

The strip transmission line sections 19 and 21 are of different width as indicated in FIGURE 2. The height of the conductive enclosure 10 is designed to be such that an impedance match will be provided between the strip transmission lines 19, 21 and 22, and the coaxial transmission line input 12; the transition from the single strip transmission line 22 to the double strip transmission lines 19 and 21 is also designed to preserve the impedance match between these two sections of the power divider.

A power absorbing or loss material 23 which may be an electrically resistive material is located between strip transmission lines 19 and 21 along a substantial portion of their length. The length of resistive portion 23 is not critical but to some extent will control the power dissipating capabilities of the device. The right end (in FIGURE 1) of the power absorbing body 23 may be tapered as shown to minimize reflections at this end.

The width of strip transmission line section 19 relative to that of strip transmission line section 21 is determinative of the ratio of power supplied to outputs 13 and 14 respectively. The ratio of power outputs will be substantially directly proportional to the respective widths of strip transmission lines 19 and 21. For example, if strip transmission line 19 is one and one-half times the width of strip transmission line 21, the power supplied at output 13 will be substantially one and one-half times that supplied at output 14.

The width of the conductive enclosure 10 is not particularly critical, and as previously explained, the separations of strips 19 and 21 as well as strip 22 from the upper and lower walls 16 and 18, together with the width of transmission lines 19, 21 and 22, will control the characteristic impedance of the transmission line and will normally be adjusted to match the characteristic impedance of the coaxial input 12. Such impedance might typically be 50 ohms.

An enlarged section 24 of the enclosure 10 is provided to separate the outputs 13 and 14 to achieve isolation therebetween. Strip transmission lines 19 and 21 are tapered outward to maintain an appropriate spacing between the respective transmission lines and the outer surface of the enclosure 10 to maintain the proper characteristic impedance as previously explained. The ends 25 and 26 of strip transmission lines 19 and 21 are tapered to provide an impedance match with center conductors 27 and 28 of coaxial line outputs 13 and 14 respectively. The impedance match may, of course, be achieved in a different manner, if desired.

From the foregoing explanation it will be seen that a path of radio frequency energy is provided from input 12 to outputs 13 and 14 such that a desired division of power is provided with a minimum of reflection due to impedance mismatch or other causes. In the double center strip region, the fact that both upper strip 19 and lower strip 21 are at the same potential means that there is no net electric field between them. Therefore, in the region near the middle of the strips and between them, the field is negligible and the body of resistive material 23 placed between the strips does not in any way alter the ratio of power split, nor does it significantly attenuate the signal passing from input 12 to outputs 13 and 14. It should be noted that conventional junctions between the center conductors 20, 27 and 28, and the strip lines 19, 21 and 22, respectively will provide a good match over reasonably wide frequency ranges so that the device of FIGURE 1 is not limited to a narrow frequency range.

To continue the description of operation of the apparatus of FIGURES 1 and 2, one may deduce from the principle of reciprocity that if power were fed into outputs 13 and 14 in phase and in the unequal amplitude ratio for which the device is designed, the power from the two inputs would combine and proceed undisturbed to input 12; substantially none of the power would be absorbed in the loss material 23.

It would be expected that any other combination of phase and amplitude would result in power being dissipated in the loss material 23. This is in fact the case as may be understood by reference to FIGURES 7 and 8.

When power is fed into input 12 the electrical field in the power splitter 11 is predominantly as shown in FIGURE 7; as there is no potential difference between the two strip transmission lines there is relatively little electrical field therebetween. The electrical field therefore exists predominantly as shown in FIGURE 7 between the respective strip transmission lines and the conductive enclosure 10. It will be understood that the field pattern of FIGURE 7 is greatly simplified for clarity.

In view of the principle of reciprocity the field pattern existing for power supplied with the power splitter design ratio of amplitudes and in phase at outputs 13 and 14 would be the same as for the reciprocal condition and would therefore also conform predominantly to FIGURE 7.

On the other hand, power supplied out of phase or not in the predetermined amplitude ratio to the outputs 13 and 14 would result in a field distribution which can always be decomposed into some combination of the orthogonal field distributions of FIGURES 7 and 8, since these are the two possible propagating modes of the structure at the operating frequency. That power present in the field corresponding to FIG. 7 proceeds undisturbed towards line 12. The power in the field of the type shown in FIG. 8 passes through the loss material 23; this power will be substantially absorbed, resulting in isolation of output 13 from output 14 for this condition.

A more rigorous explanation of the operation may be derived by the use of matrix techniques. In the following discussion it will be understood that the term "scattering matrix" describes the behavior of a microwave device in terms of the incident and reflected waves present in each arm connected to the device. Thus if $a_1, a_2, \ldots$ represent the incident waves in each of these arms, and $b_1, b_2, \ldots$ represent the corresponding reflected waves, then the $a$'s and $b$'s are related by $$b_1 = S_{11}a_1 + S_{12}a_2 + S_{13}a_3 + \ldots$$
$$b_2 = S_{21}a_1 + S_{22}a_2 + S_{23}a_3 + \ldots$$
$$\vdots$$

The terms $S_{11}$, $S_{12}$ etc. are called the elements of the "Scattering matrix," since they can be arranged in the following matrix form:

$$\begin{bmatrix} S_{11} & S_{12} & S_{13} \ldots & . \\ S_{21} & S_{22} & S_{23} \ldots & . \\ . & & & . \\ . & & & . \\ . & & & . \end{bmatrix}$$

Physically, $S_{11}$ represents the ratio of the reflected wave in arm 1 to the incident wave in that arm when no other arm is excited (that is, $a_2=0$, $a_3=0$, etc.) or, $S_{13}$ represents the ratio of the reflected wave in arm 1 to the incident wave in arm 3 when no other arm but 3 is excited. To show the existence of output terminal isolation, let us recognize first that there always exists some excitation combination for outputs 13 and 14 which is orthogonal to the desired power split. For example, suppose unit power is incident from input 12, and the power splits into outputs 13 and 14, respectively, as:

$$\frac{1}{1+\alpha^2} \text{ and } \frac{\alpha^2}{1+\alpha^2} \tag{1}$$

The electric fields, or voltages, at outputs 13 and 14 can then be written in the vector form:

$$\frac{1}{\sqrt{1+\alpha^2}}\begin{pmatrix} 1 \\ \alpha \end{pmatrix} \tag{2}$$

where the upper and lower quantities refer to outputs 13 and 14, respectively. The voltage excitation:

$$\frac{1}{\sqrt{1+\alpha^2}}\begin{pmatrix} -\alpha \\ 1 \end{pmatrix} \tag{3}$$

at outputs 13 and 14, is then orthogonal to the original power split excitation (2), as is readily vertified by taking the scalar product of the vectors (2) and (3). In an ideal design, this orthogonal excitation (3) entering via outputs 13 and 14 would be completely absorbed in the loss material arm 23, and no power would exit from output 12. In a practical situation with smooth tapers (or steps) this situation could be achieved without significant reflection. If this is so, and if all input and output arms are separately matched, then output arms 13 and 14 will be completely isolated from each other (i.e., hybrid to each other).

An examination of the scattering matrix of the ideal power splitter with input and output arms numbered as in FIG. 1, indicates that biconjugacy can be achieved by this structure. The resistive load on loss material arm 23 renders this arm inaccessible, but the 4 by 4 matrix below assumes it to be accessible so that the device can be regarded as lossless and the matrix can be required to be unitary. To repeat, in its expected use, power enters via input arm 12 and splits unequally into output arms 13 and 14, with no power entering loss material arm 23. Also, in this ideally matched device, power entering from arm 13 (or 14) will go into arms 12 and 23 only, but not into arm 14 (or 13). The scattering matrix below satisfies all of these requirements, and is consistent with the unitary requirement as well. The incident power is made equal to unity, so that the power split from arm 12 into arms 13 and 14 is given by (1). The scattering matrix turns out to be:

$$\frac{1}{\sqrt{1+\alpha^2}}\begin{bmatrix} 0 & 0 & 1 & \alpha \\ 0 & 0 & -\alpha & 1 \\ 1 & -\alpha & 0 & 0 \\ \alpha & 1 & 0 & 0 \end{bmatrix}$$

If the device is regarded as a three-arm device, with the load on arm 23 built-in, then it becomes lossy and its scattering matrix is no longer unitary. However, one can still write $$b_1=S_{13}a_3+S_{14}a_4$$
$$b_3=S_{31}a_1$$
$$b_4=S_{41}a_1$$

or, equivalently, $$\begin{matrix} b_1 \\ b_3 \\ b_4 \end{matrix}=\frac{1}{\sqrt{1+\alpha^2}}\begin{bmatrix} 0 & 1 & \alpha \\ 1 & 0 & 0 \\ \alpha & 0 & 0 \end{bmatrix}\begin{bmatrix} a_1 \\ a_3 \\ a_4 \end{bmatrix}$$

This result is consistent with the four-arm matrix, and is exactly the performance required as an ideal matched unequal power splitter. These matrix manipulations show that a theoretically ideal device designed according to the invention does not violate any fundamental principles.

Figure 3:
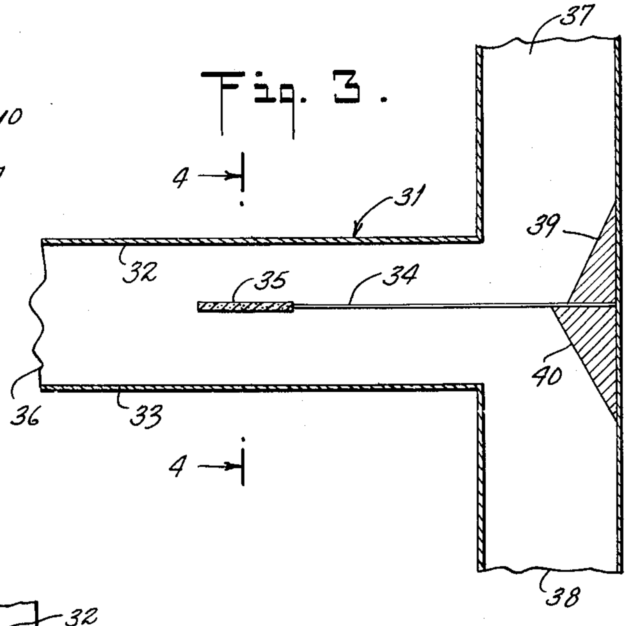
FIGURE 3 is a vertical, longitudinal cross sectional view of an alternative form of the invention particularly adapted for use with rectangular waveguide inputs and outputs.
Figure 4:
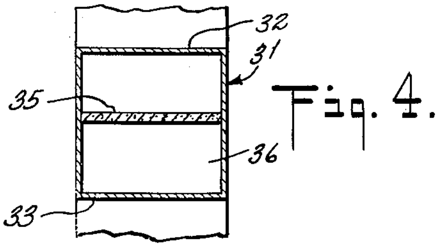
FIGURE 4 is a vertical, transverse sectional view of the device of FIGURE 3 taken along the line 4—4 in FIGURE 3.

An alternate form of power splitting device is shown in FIGS. 3 and 4 which is particularly adapted for use in conjunction with rectangular waveguide transmission lines, but may also be adapted to coaxial transmission lines (as indicated in FIG. 6). Referring to FIGS. 3 and 4, the power splitter 31 is formed of rectangular waveguide sections forming a T and in which section 36 is the input waveguide section while sections 37 and 38 are output waveguide sections.

The input waveguide section 36 has inserted therein a conductive divider 34 spaced unequally between the upper wall 32 and the lower wall 33 of the input waveguide section 36. A thin strip of loss material 35 is placed at the end of the conductive divider 34 and in coplanar relationship with the conductive divider 34.

Matching means may be provided for the outputs 37 and 38 such as the mitered corners 39 and 40. Due to the off center placement of the divider 34, the miters 39 and 40 are slightly different and a slight difference in phase would be introduced at the outputs 37 and 38. This may readily be compensated by making the output waveguide sections 37 and 38 of slightly different lengths so that the outputs are exactly 180° out of phase. It will usually be desired that the outputs are exactly in phase rather than 180° out of phase; this condition may be achieved by adding a 90° twist (not shown) in opposite directions in each of the output arms 37 and 38. The same condition could be achieved by employing H-plane waveguide bends rather than the E-plane wave guide bends shown in FIG. 3.

The apparatus of FIGURES 3 and 4 operates in a fashion analogous to that of the apparatus of FIGURES 1 and 2. Power introduced into the input waveguide section 32 is in the dominant $TE_{10}$ mode and has only a vertical electrical component. Therefore power passing into the divided section of the input waveguide 36 is divided in a ratio equal to the respective distances of the divider 34 from the top wall 32 and from the bottom wall 33. Thus the power split is determined in a direct and simple fashion. As the dividing conductive wall 34 is thin, it presents no disturbance to power propagating through input waveguide 36.

Similarly if the resistive material 35 extending from the edge of the divider plate 34 is thin, negligible insertion loss is produced because the electric field lines are perpendicular to the sheet of loss material. Furthermore the power split ratio is not affected by the presence of the resistive loss material 35. The separate power outputs then proceed out of output waveguide sections 37 and 38, desired impedance matching and phase control being provided as previously described.

As was seen in the explanation of the device of FIGS. 1 and 2, the principle of reciprocity indicates that if signals in phase and in the specified unequal power ratio were fed into output waveguide sections 37 and 38, these signals would proceed undisturbed back to the input waveguide section 36. As expected, any other phase and amplitude combination would cause some absorption of power by the loss material 35.

It will be observed that in the operation of the device of FIGS. 3 and 4, it is contemplated that the input power will be transformed smoothly into the dominant $TE_{10}$ mode which is substantially unaffected by the presence of the resistive material 35 or the divider wall 34. On the other hand higher modes possessing longitudinal electric field components (which are absorbed by the loss material 35) are excited only by reflections from the output sections 37 and 38. In the device of FIGS. 3 and 4 these higher modes are all below cutoff. It may be preferred to facilitate matching into the loss material by allowing the most important of the higher modes, namely the $TM_{11}$ (or $E_{11}$) mode, to be above cutoff in a portion of the input waveguide section.

FIGURE 5 shows a modification of the device of FIGURES 3 and 4 which provides the feature that allows the $TM_{11}$ mode to propagate freely in a region of the input waveguide. In the device of FIG. 5 a power splitter 51 is provided having an input waveguide section 54, and output waveguide sections 52 and 53. The input waveguide section 54 has an enlarged portion 55 in which the $TM_{11}$ mode can propagate freely. As in the device of FIGS. 3 and 4, a resistive body 57, a conductive divider 56, and mitered corners 58 and 59 are provided.

A tapered portion 61 is provided as a transition to the portion of input waveguide 54 in which the $TM_{11}$ mode can propagate as well as the dominant $TE_{10}$ mode. It may of course be desirable to provide some other transition arrangement such as a series of steps.

The operation of the device of FIG. 5 may be better understood by reference to the electric field diagrams of FIGS. 9 and 10.

It will be observed in FIGURE 9, that the $TE_{10}$ mode with its vertical electrical field lines is not significantly attenuated by the thin strip of loss material 57, as the electric field lines do not pass through the loss material for any significant distance. Thus power which is introduced into input waveguide 54 and is transformed into this mode is passed through to the output waveguides 52 and 53 without substantial attenuation.

On the other hand, as may be seen in FIGURE 10, the $TM_{11}$ mode which arises solely due to reflections from the power splitter outputs is propagated in the enlarged section 55 of the input waveguide 54, but due to its longitudinal electric field component is substantially absorbed in the loss material 57. In the device of FIGURE 5, it is contemplated that higher modes other than the $TM_{11}$ mode will be below cutoff in the enlarged section 55 of the input waveguide 54. The $TM_{11}$ mode is, however, the most important as it decays least rapidly.

From the foregoing explanation, it will be seen that devices according to the present invention have the common feature that each embodiment possesses at least a small region within which two orthogonal modes exist. The input power is transformed smoothly into one of these modes and does not excite the other or second of the two modes. The second of the two modes is excited only by reflections from the outputs of the power splitter. Each embodiment is provided with a lossy termination section which is arranged so that it absorbs the second of the two modes without substantially interfering with the propagation of the first mode.

FIGURE 6 is a further alternative form of the invention which is similar to the devices of FIGURES 3–5 except that it is adapted for use with coaxial transmission line inputs and outputs. The power divider device 71 is provided with a coaxial input 72 and coaxial outputs 73 and 74. Input coaxial line section 72 comprises an outer conductor 75 and a center conductor 76.

A cylindrical coaxial divider 77 of conductive material is arranged within the input coaxial line 75. At the input edge of the divider 77 a thin hollow resistive body 78 of cylindrical form is arranged substantially as a continuation of the divider 77. This resistive lossy material corresponds to energy absorptive body 57 of FIGURE 5 of body 35 of FIGURES 3 and 4.

In the power divider of FIGURE 6 the power is divided in the ratio $$\frac{P_1}{P_2}=\frac{Ln\frac{b}{a}}{Ln\frac{d}{c}}$$

where $a$ is the outer diameter of inner conductor 76, $b$ is the inner diameter of intermediate conductor 77, $c$ is the outer diameter of intermediate conductor 77, $d$ is the inner diameter of outer conductor 71, $P_1$ is the power in inner transmission line, and $P_2$ is the power in outer transmission line. The divider 77 makes a right angle turn and has a vertical section 81 which is coaxial with the center conductor 83 of the output 73. The section 81 is terminated at 82 at an effective length of one-quarter wavelength so that the section 81 comprises a quarter wavelength stub and substantially all of the energy transmitted between the divider 77 and the outer conductor 75 is transmitted out of the ouput 74. Of course any other suitable means may be utilized to provide a smooth well matched transition from the effectively triaxial transmission line comprising conductors 75, 76 and 77 to the coaxial outputs 73 and 74. The center conductor 85 of the output 74 is placed in conductive relationship with the conductive divider 77. Any suitable matching structure may be utilized to provide an impedance match at this point. It will be noted that there is a change in diameter of the center conductor 83 in the plane of the terminating ring 82, also for impedance matching purposes. Any of the various impedance matching arrangements shown may of course be altered in accordance with the known techniques in the art.

The coaxial power divider of FIGURE 6 operates substantially in the same fashion as the power dividers shown in FIGURES 3, 4 and 5 and accordingly a detailed explanation of its operation is unnecessary. One difference exists in the device of FIGURE 6 which should be pointed out, namely that the use of a quarter wave stub in the transition from the triaxial section to the two coaxial sections introduces a frequency sensitive element so that the specific device shown in FIGURE 6 is inherently not as broadband as are the other forms of the invention.

From the foregoing explanation it will be seen that radio frequency power splitters are provided according to the present invention which are superior in various respects to those previously known, chiefly in that they provide a simple means of obtaining an unequal power split without loss of other desirable characteristics. All embodiments of the invention are characterized by having at least a small region within which two orthogonal modes of propagation exist. The input power is transformed smoothly into the first of these modes and does not excite the other of the two modes to any substantial extent. The second of the two modes is excited only by reflections from the outputs of the device and is absorbed in an energy absorbing termination which does not substantially interfere with propagation of the first mode.

It will be appreciated that many variations and modifications to the invention are possible in addition to those shown and suggested. Accordingly, the scope of the invention is not to be construed to be limited to the embodiments and variations shown and suggested but is to be limited solely by the appended claims.

What is claimed is:

1. Radio frequency power splitting apparatus comprising a rectangular waveguide input transmission line having at least a small region capable of at least partially supporting two orthogonal modes of propagation having respectively predetermined electric field line configurations, means for transforming input power supplied to said input transmission line into only a first of these orthogonal modes, means for dividing the power propagated in said first mode in said input transmission line into at least two unequal portions, said means comprising at least one conductive wall dividing the cross-sectional area of said input transmission line into at least two unequal parts, at least two rectangular waveguide output transmission line sections, means for transmitting said portions to respective ones of said output transmission line sections without substantial attenuation of or interaction beween said portions and for causing power supplied to said apparatus at a single one of said output transmission lines to be propagated at least partially in the second of said orthogonal modes in said region of said input transmission line, and means located in said region for absorbing power propagated in the second of said modes without substantially attenuating the first of said modes, the last said means comprising a thin body of loss material located substantially transverse to electric field lines of said first mode, whereby said output transmission line sections are substantially isolated from each other as respects radio frequency power within the operating frequency range of the apparatus.

2. Radio frequency power splitting apparatus comprising an input microwave transmission line having at least a small region capable of at least partially supporting two orthogonal modes of propagation having respectively predetermined electric field line configurations, means for transforming input power supplied to said input microwave transmission line into only a first of these orthogonal modes, means for dividing the power propagated in said first mode in said input radio frequency transmission line into two portions, said means comprising a thin wall dividing the internal cross-sectional area of said transmission line into two parts, said wall being normal to the electric lines of force of said first mode, two output microwave transmission line sections, means for transmitting said portions to respective ones of said output microwave transmission line sections without substantial attenuation of or interaction between said portions and for causing power supplied to said apparatus at a single one of said output microwave transmission lines to be propagated at least partially in the second of said orthogonal modes in said region of said input microwave transmission line, and means located in said region for absorbing power propagated in the second of said modes without substantially attenuating the first of said modes, the last said means comprising a thin walled body of loss material located with said walls substantially normal to electric field lines of said first mode, whereby said output radio frequency transmission line sections are substantially isolated from each other as respects radio frequency power within the operating frequency range of the apparatus.

3. Radio frequency power splitting apparatus comprising an input radio frequency transmission line having at least a small region capable of at least partially supporting two orthogonal modes of propagation, means for transforming input power supplied to said input radio frequency transmission line into only a first of these orthogonal modes, means for dividing the power propagated in said first mode in said input radio frequency transmission line into at least two portions, at least two output radio frequency transmission line sections, means for transmitting said portions to respective ones of said output radio frequency transmission line sections without substantial attenuation of or interaction between said portions and for causing power supplied to said apparatus at a single one of said output radio frequency transmission lines to be propagated at least partially in the second of said orthogonal modes in said region of said input radio frequency transmission line, and means located in said region for absorbing power propagated in the second of said modes without substantially attenuating the first of said modes, whereby said output radio frequency transmission line sections are substantially isolated from each other as respects radio frequency power within the operating frequency range of the apparatus.

References Cited in the file of this patent

UNITED STATES PATENTS

| | | |
|---|---|---|
| 2,684,469 | Sensiper | July 20, 1954 |
| 2,981,906 | Turner | Apr. 25, 1961 |

OTHER REFERENCES

"Microwave Transmission Circuits" (Ragan). McGraw-Hill Book Co., New York, 1948. Pages 522–528 relied on.)